(12) United States Patent
Jang et al.

(10) Patent No.: US 8,982,309 B2
(45) Date of Patent: Mar. 17, 2015

(54) LIQUID CRYSTAL DISPLAY DEVICE

(71) Applicant: Samsung Display Co., Ltd., Yongin (KR)

(72) Inventors: Jae-Soo Jang, Suwon-si (KR); Hak-Sun Chang, Yongin-si (KR); Jang Wi Ryu, Seoul (KR); Ki Chul Shin, Suwon-si (KR)

(73) Assignee: Samsung Display Co., Ltd., Yongin (KR)

( * ) Notice: Subject to any disclaimer, the term of this patent is extended or adjusted under 35 U.S.C. 154(b) by 184 days.

(21) Appl. No.: 13/845,966

(22) Filed: Mar. 18, 2013

(65) Prior Publication Data

US 2014/0132874 A1 May 15, 2014

(30) Foreign Application Priority Data

Nov. 13, 2012 (KR) .................... 10-2012-0128097

(51) Int. Cl.
*G02F 1/1343* (2006.01)
*G02F 1/1337* (2006.01)
*G02F 1/136* (2006.01)
*G02F 1/1335* (2006.01)
*G02F 1/1362* (2006.01)
*G02F 1/137* (2006.01)

(52) U.S. Cl.
CPC .... *G02F 1/134309* (2013.01); *G02F 1/133514* (2013.01); *G02F 1/133707* (2013.01); *G02F 1/1362* (2013.01); *G02F 1/136209* (2013.01); *G02F 2001/133742* (2013.01); *G02F 2001/13775* (2013.01)
USPC ............. 349/146; 349/130; 349/44; 349/106; 349/123

(58) Field of Classification Search
CPC .................... G02F 1/134309; G02F 1/134336; G02F 1/133707; G02F 1/1393; G02F 2001/133702; G02F 1/136702; G02F 1/136209; G02F 1/133512; G02F 1/133227; G02F 1/133514; G02F 1/133516; G02F 1/3337; G02F 1/133711; G02F 1/134363
USPC ............................. 349/146, 130, 44, 106, 123
See application file for complete search history.

(56) References Cited

U.S. PATENT DOCUMENTS 6,281,960 B1   8/2001  Kishimoto et al.
7,075,600 B2   7/2006  Song et al.

(Continued)

FOREIGN PATENT DOCUMENTS

JP   2001-083520   3/2001
JP   2002-268066   9/2002

(Continued)

*Primary Examiner* — Mike Qi
(74) *Attorney, Agent, or Firm* — H.C. Park & Associates, PLC

(57) ABSTRACT

A liquid crystal display device includes a substrate, a thin film transistor disposed on the substrate, a plurality of color filters disposed on the substrate, a light blocking member disposed between the plurality of color filters and on the thin film transistor, and a pixel electrode disposed on at least one of the plurality of color filters. The pixel electrode comprises a planar shape electrode and a plurality of minute branches extending from the planar shape electrode. The at least one of the plurality of color filters or the light blocking member comprises a step forming portion overlapped by the planar shape electrode.

26 Claims, 13 Drawing Sheets

(56) References Cited

U.S. PATENT DOCUMENTS

| | | |
|---|---|---|
| 7,426,003 B2 | 9/2008 | Tien et al. |
| 7,787,092 B2 | 8/2010 | Mizusako et al. |
| 7,804,093 B2 * | 9/2010 | Kim et al. .................. 257/59 |
| 8,102,489 B2 | 1/2012 | Kim |
| 8,223,290 B2 * | 7/2012 | Lee et al. .................. 349/48 |
| 8,804,085 B2 * | 8/2014 | Lim .................. 349/146 |

FOREIGN PATENT DOCUMENTS

| | | |
|---|---|---|
| JP | 2003-114449 | 4/2003 |
| JP | 4467682 | 3/2010 |
| KR | 10-0961959 | 5/2010 |

* cited by examiner

LIQUID CRYSTAL DISPLAY DEVICE

CROSS-REFERENCE TO RELATED APPLICATION

This application claims priority from and the benefit of Korean Patent Application No. 10-2012-0128097, filed on Nov. 13, 2012, which is incorporated by reference for all purposes as if set forth herein.

BACKGROUND

1. Field

The present invention relates to display technology, and more particularly to a liquid crystal display device.

2. Discussion

A liquid crystal display device, which is one of the most common types of flat panel displays, typically includes two panels with field generating electrodes disposed thereon, such as a pixel electrode, a common electrode, and the like, and a liquid crystal layer disposed therebetween. The liquid crystal display device is configured to apply an electric field in the liquid crystal layer by applying voltage to the field generating electrodes, determine the direction of liquid crystal molecules by the generated electric field, and control polarization of incident light to display images.

A vertically aligned mode liquid crystal display device, in which the liquid crystal molecules are arranged so that long axes thereof are vertical to the display panel in a state where the electric field is not applied in the liquid crystal display device, has been developed.

In the vertically aligned mode liquid crystal display device, ensuring a wide viewing angle is difficult, and a method of forming cutouts such as minute slits (or apertures) in the field generating electrode is typically used in order to ensure the wide viewing angle. Since cutouts and protrusions determine tilt directions of the liquid crystal molecules, the tilt directions of the liquid crystal molecules may be distributed in various directions based on the disposition of the cutouts and protrusions. As a result, the viewing angle may be increased.

In the case of a method of forming a plurality of branch electrodes by forming one or more minute slits in the pixel electrode, an aperture ratio of the liquid crystal display device may be reduced, and as a result, transmittance may be deteriorated.

Therefore, there is a need for an approach that provides efficient, cost effective techniques to provide liquid crystal display devices with improved transmittance and aperture ratios, as well as configured to reduce textures or other image quality degradations.

The above information disclosed in this Background section is only for enhancement of understanding of the background of the invention and therefore it may contain information that does not form the prior art that is already known in this country to a person of ordinary skill in the art.

SUMMARY

Exemplary embodiments provide a liquid crystal display device configured to improve transmittance and an aperture ratio, as well as configured to reduce a texture or other image quality degradations.

Additional aspects will be set forth in the detailed description which follows and, in part, will be apparent from the disclosure, or may be learned by practice of the invention.

According to exemplary embodiments, a display device includes: a substrate; a thin film transistor disposed on the substrate; a plurality of color filters disposed on the substrate; a light blocking member disposed between the plurality of color filters and on the thin film transistor; and a pixel electrode disposed on at least one of the plurality of color filters, the pixel electrode including a planar shape electrode and a plurality of minute branches extending from the planar shape electrode. The at least one color filter or the light blocking member includes a step forming portion overlapped by the planar shape electrode.

According to exemplary embodiments, since a part of a pixel electrode forms a planar shape electrode together with a minute pattern of electrode extensions, a viewing angle and side visibility of the display device are increased, and a response speed is also increased. Moreover, the texture occurring in a pixel may be reduced by forming a step forming portion by using a light blocking member or a color filter. Further, when a step forming portion is disposed using the color filter, step levels of a red color filter, a green color filter, and a blue color filter may be different from each other to prevent a change in the luminance with time.

The foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the principles of the invention.

DETAILED DESCRIPTION OF EXEMPLARY EMBODIMENTS

Figure 1:
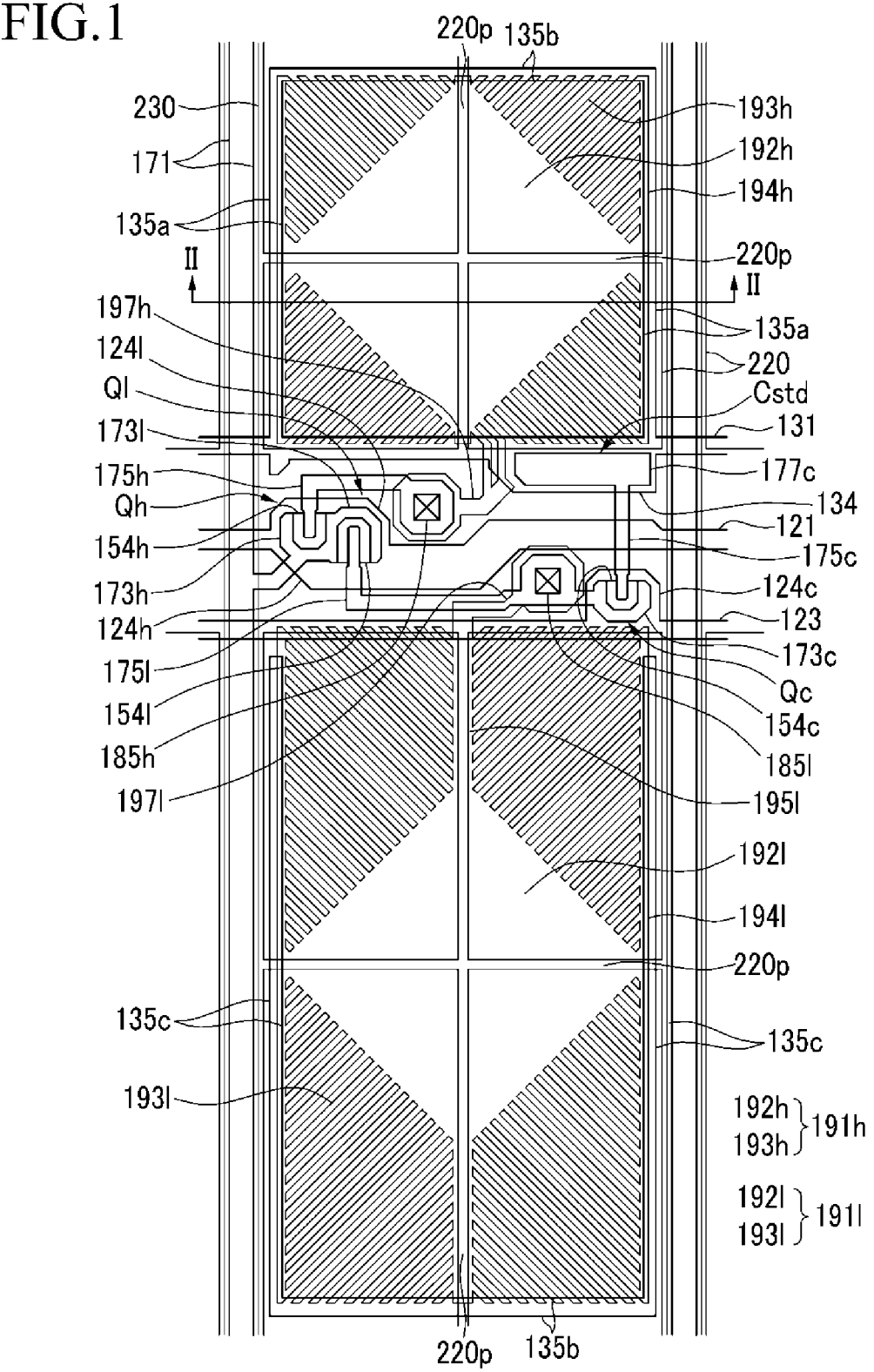
FIG. 1 is a plan view of a liquid crystal display device, according to exemplary embodiments.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of layers, films, panels, regions, etc., may be exaggerated for clarity and descriptive purposes. Also, like reference numerals denote like elements.

When an element or layer is referred to as being "on," "connected to," or "coupled to" another element or layer, it may be directly on, connected to, or directly coupled to the other element or layer or intervening elements or layers may be present. When, however, an element or layer is referred to as being "directly on," "directly connected to," or "directly coupled to" another element or layer, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present disclosure.

Spatially relative terms, such as "beneath," "below," "lower," "above," "upper," and/or the like, may be used herein for descriptive purposes and, thereby, to describe one element or feature's relationship to another element(s) or feature(s) as illustrated in the drawings. Spatially relative terms are intended to encompass different orientations of an apparatus in use or operation in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations) and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Various exemplary embodiments are described herein with reference to sectional illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not be construed as limited to the particular illustrated shapes of regions, but are to include deviations in shapes that result from, for instance, manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the drawings are schematic in nature and their shapes are not intended to illustrate the actual shape of a region of a device and are not intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

Figure 2:
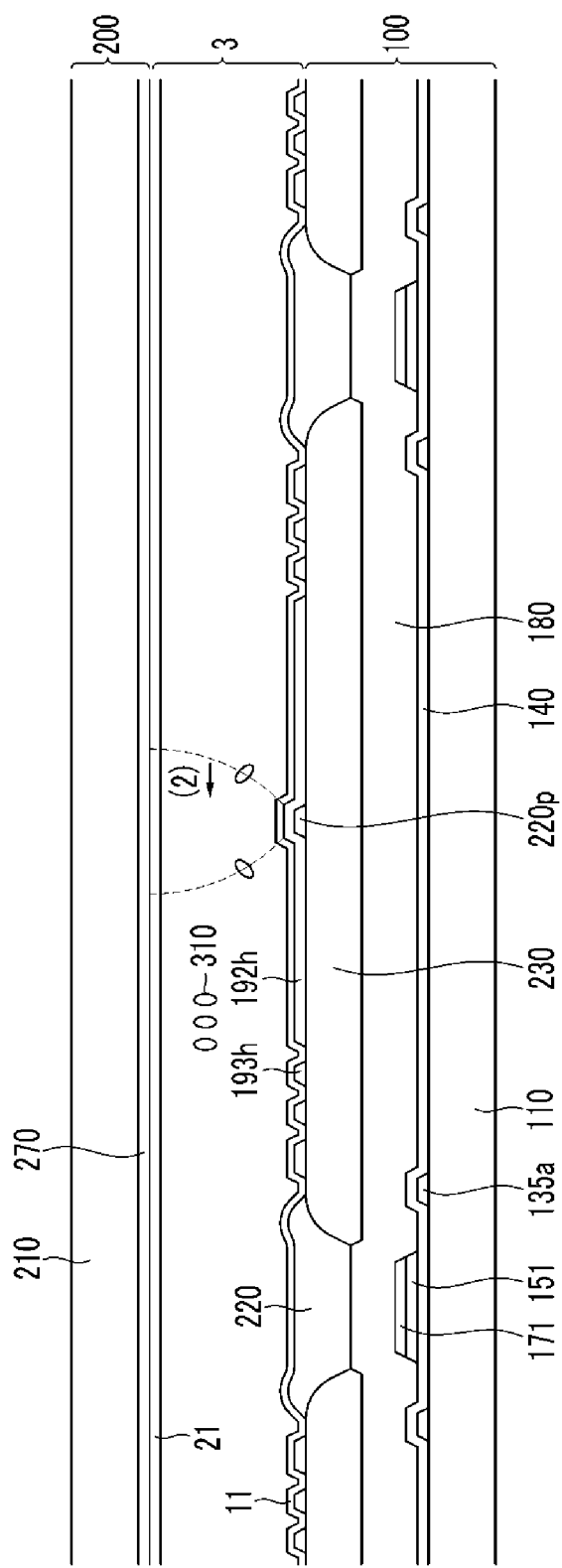
FIG. 2 is a cross-sectional view of the liquid crystal display device of FIG. 1 taken along sectional line II-II, according to exemplary embodiments.
Figure 3:
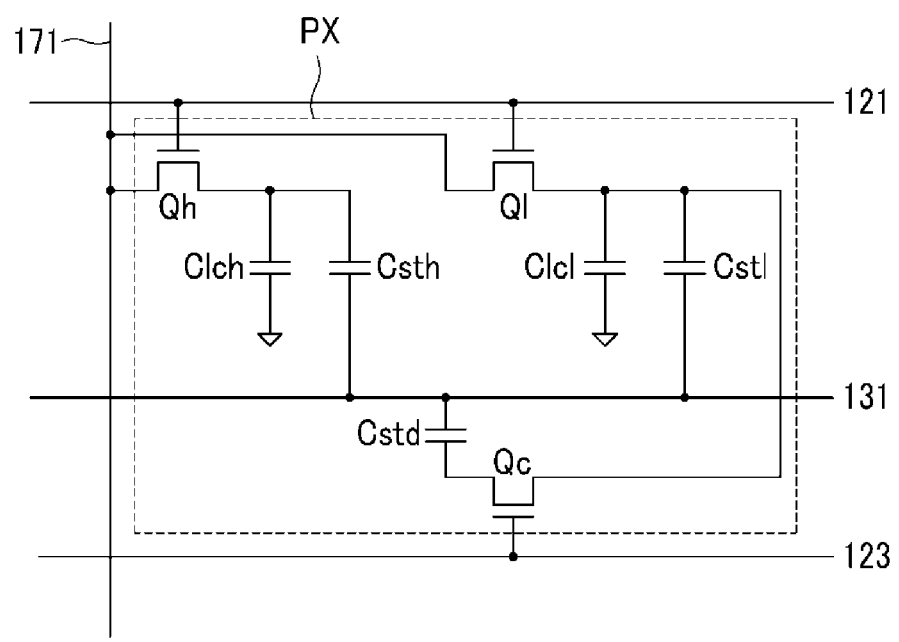
FIG. 3 is an equivalent circuit diagram of a pixel of the liquid crystal display device of FIG. 1, according to exemplary embodiments.
Figure 4:
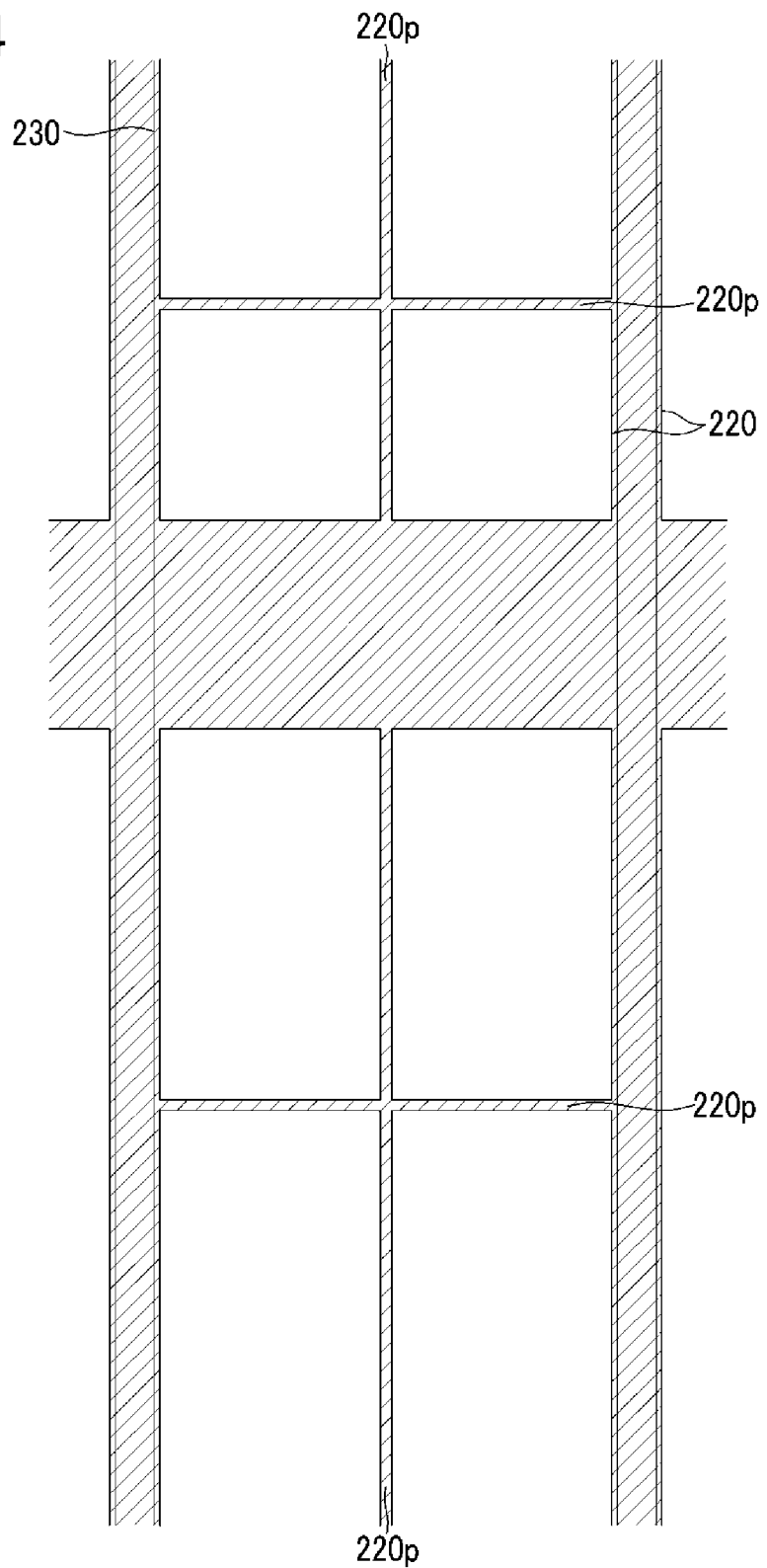
FIG. 4 is a plan view of a color filter and a light blocking member of the liquid crystal display device of FIG. 1, according to exemplary embodiments.

FIG. 1 is a plan view of a liquid crystal display device, according to exemplary embodiments. FIG. 2 is a cross-sectional view of the liquid crystal display device of FIG. 1 taken along sectional line II-II. FIG. 3 is an equivalent circuit diagram of a pixel of the liquid crystal display device of FIG. 1, according to exemplary embodiments. FIG. 4 is a plan view of a color filter and a light blocking member of the liquid crystal display device of FIG. 1, according to exemplary embodiments.

Referring to FIGS. 1 and 2, the liquid crystal display device includes a lower panel 100, an upper panel 200, a liquid crystal layer 3 disposed between panels 100 and 200, and a pair of polarizers (not illustrated) disposed on the outside of the panels 100 and 200.

First, the lower panel 100 will be described.

On an insulation substrate 110, a plurality of gate conductors, including a plurality of gate lines 121, a plurality of step-down gate lines 123, and a plurality of storage electrode lines 131, is disposed.

The gate lines 121 and the step-down gate lines 123 mainly extend in a horizontal (or substantially horizontal) direction and are configured to transfer gate signals. The gate lines 121 include a first gate electrode 124h and a second gate electrode 124l, which protrude upward and downward, and the step-down gate lines 123 include a third gate electrode 124c, which protrudes upward. As seen in FIG. 1, the first gate electrode 124h and the second gate electrode 124l are connected to each other to form one protrusion.

The storage electrode line 131 mainly extends in a horizontal (or substantially horizontal) direction and is configured to transfer a predetermined voltage, such as a common voltage Vcom. The storage electrode line 131 includes storage electrodes 135a, 135b, and 135c, and includes a capacitor electrode 134 extending downward. The storage electrode line 131 includes two first vertical storage electrode parts 135a extending upward, a horizontal storage electrode part 135b connecting two first vertical storage electrode parts 135a, and two second vertical storage electrode parts 135c extending upward from the horizontal storage electrode part 135b.

The first vertical storage electrode part 135a is disposed along a vertical (or substantially vertical) edge of the first pixel electrode 191h disposed at the top of the first vertical storage electrode part 135a, and the second vertical storage electrode part 135c is disposed along a vertical (or substantially vertical) edge of the second pixel electrode 191l. The horizontal storage electrode part 135b is disposed between a horizontal (or substantially horizontal) edge of the front second pixel electrode 191l and a horizontal (or substantially horizontal) edge of the present first pixel electrode 191h and is disposed along two horizontal (or substantially horizontal) edges.

As a result, the first vertical storage electrode part 135a and the horizontal storage electrode part 135b are disposed along the edge of the first pixel electrode 191h to be at least partially overlapped with the first pixel electrode 191h. The second vertical storage electrode part 135c and the horizontal storage electrode part 135b are disposed along the edge of the second pixel electrode 191l to be at least partially overlapped with the second pixel electrode 191l.

In FIG. 1, the horizontal storage electrode part 135b disposed at the upper portion and the horizontal storage electrode part 135b disposed at the lower portion are separated from each other, but are electrically connected with the horizontal storage electrode part 135b disposed in upper and lower adjacent pixels PX.

A gate insulating layer 140 is disposed on the gate conductors 121, 123, and 131.

A plurality of semiconductors made of amorphous or crystalline silicon is disposed on the gate insulating layer 140. The semiconductor includes first and second semiconductors 154h and 154l which mainly extend in a vertical (or substantially vertical) direction, extend toward the first and second gate electrodes 124h and 124l, and are connected to each other, and a third semiconductor 154c connected with the second semiconductor 154l. The third semiconductor 154c extends to form a fourth semiconductor (not illustrated). The fourth semiconductor is not illustrated on the plan view of FIG. 1, but may be disposed to have substantially the same shape as a third drain electrode 175c and a wide end portion 177c of the third drain electrode 175c below the third drain electrode 175c and the wide end portion 177c of the third drain electrode 175c, as will become more apparent below.

A plurality of ohmic contacts (not illustrated) may be disposed on the semiconductors 154h, 154l, and 154c. A first ohmic contact (not illustrated) may be disposed on the first semiconductor 154h, and a second ohmic contact (not illustrated) and a third ohmic contact (not illustrated) may be disposed even on the second semiconductor 154l and the third semiconductor 154c, respectively. The third ohmic contact extends to form a fourth ohmic contact (not illustrated).

On the ohmic contacts, a data conductor, including a plurality of data lines 171, a plurality of first drain electrodes 175h, a plurality of second drain electrodes 175l, and a plurality of third drain electrodes 175c, is disposed.

The data lines 171 are configured to transfer data signals and mainly extend in a vertical (or substantially vertical) direction to cross the gate line 121 and the step-down gate line 123. Each data line 171 extends toward the first gate electrode 124h and the second gate electrode 124l, and includes a source electrode 173h and a second source electrode 173l connected to each other.

The first drain electrode 175h, the second drain electrode 175l, and the third drain electrode 175c include one wide end portion and the other rod end portion. The rod end portions of the first drain electrode 175h and the second drain electrode 175l are partially surrounded by the first source electrode 173h and the second source electrode 173l. One wide end portion of the second drain electrode 175l extends to form a third source electrode 173c, which is bent in a U-lettered shape. The wide end portion 177c of the third drain electrode 175c is overlapped with the capacitor electrode 134 to form a step-down capacitor Cstd, and the rod end portion is partially surrounded by the third source electrode 173c.

The first/second/third gate electrodes 124h/124l/124c, the first/second/third source electrodes 173h/173l/173c, and the first/second/third drain electrodes 175h/175l/175c form first/second/third thin film transistors (TFTs) Qh/Ql/Qc together with the first/second/third semiconductors 154h/154l/154c, respectively. Channels of the thin film transistors Qh/Ql/Qc are disposed in the respective semiconductors 154h/154l/154c between the source electrodes 173h/173l/173c and the drain electrodes 175h/175l/175c, respectively.

The semiconductors 154h, 154l, and 154c have substantially the same plane shape with the data conductors 171, 175h, 175l, and 175c and an ohmic contact (not illustrated) therebelow, except for a channel region between the source electrodes 173h, 173l, and 173c and the drain electrodes 175h, 175l, and 175c. That is, the exposed portion which is not covered by the data conductors 171, 175h, 175l, and 175c, in addition to between the source electrodes 173h, 173l, and 173c and the drain electrodes 175h, 175l, and 175c, is disposed at the semiconductors 154h, 154l, and 154c.

On the data conductors 171, 175h, 175l, and 175c and the exposed portion of the semiconductors 154h, 154l, and 154c, a passivation layer 180 that is made of (or includes) an inorganic insulator, such as silicon nitride or silicon oxide, is disposed.

A color filter 230 is disposed on the passivation layer 180. The color filter 230 is elongated in a vertical (or substantially vertical) direction between adjacent data lines 171. The respective color filters 230 may display one of primary colors, such as three primary colors of red, green, and blue, and the respective color filters 230 may be spaced apart from each other based on the data lines 171 elongated in a vertical (or substantially vertical) direction. According to exemplary embodiments, a thickness of the color filter 230 may be substantially regular in the pixel area.

When the adjacent color filters 230 are spaced apart from each other based on the data lines 171, the passivation layer 180 may be exposed. A light blocking member 220 is disposed between the adjacent color filters 230, while covering the exposed passivation layer 180.

The light blocking member 220 includes a portion elongated in a vertical (or substantially vertical) direction along the data line 171, and a portion elongated in a horizontal (or substantially horizontal) direction along the gate line 121 while covering the thin film transistor. A region that is not covered by the light blocking member 220 becomes a region configured to display an image by emitting light to an outside of the display device.

The light blocking member 220 may be arranged in a matrix shape to prevent a light leakage. In exemplary embodiments, the light blocking member 220 includes a step forming portion 220p disposed in the pixel area. The step forming portion 220p may have a cross shape as illustrated in FIGS. 1 and 2, and is disposed on the color filter 230. As seen in FIG. 4, the step forming portion 220p formed in the cross shape includes a horizontal (or substantially horizontal) portion extending in substantially the same direction as the gate line 121 and a vertical (or substantially vertical) portion crossing the horizontal (or substantially horizontal) portion. The horizontal (or substantially horizontal) portion of the step forming portion 220p is elongated to be connected with the vertical (or substantially vertical) portion of the light blocking member 220, and the vertical (or substantially vertical) portion of the step forming portion 220p is elongated to be connected with the horizontal (or substantially horizontal) portion of the light blocking member 220. However, the step forming portion 220p is not necessarily required to be connected with the light blocking member 220 disposed along the edge of the pixel area and may be disconnected with the light blocking member 220 to be independently formed in the pixel area. However, the step forming portion 220p may be formed with the same material as the light blocking member 220.

An overcoat (not illustrated) may be disposed on the color filter 230 before formation of the light blocking member 220. Accordingly, the overcoat may be disposed between the color filter 230 and the light blocking member 220. The overcoat may be configured to prevent the color filter 230 from being lifted and to prevent a defect, such as an afterimage that may be caused during a screen driving, by suppressing contamination of the liquid crystal layer 3 by an organic material, such as a solvent, flowing into the color filter 230, and may be made of (or include) an inorganic insulator, such as silicon nitride or silicon oxide, or an organic material.

In the passivation layer 180 and the color filter 230, a plurality of first contact holes 185h and a plurality of second contact holes 185l that expose a wide end portion of the first drain electrode 175h and a wide end portion of the second drain electrode 175l are formed.

A plurality of pixel electrodes 191 is disposed on the color filter 230. The pixel electrodes 191 are separated from each other with the two gate lines 121 and 123 therebetween, and includes a first subpixel electrode 191h and a second subpixel electrode 191l, which are disposed in upper and lower portions of the pixel area to be adjacent to each other in a column direction.

The first subpixel electrode 191h and the second subpixel electrode 191l include planar shape electrodes 192h and 192l that are disposed at the center portions of the first subpixel electrode 191h and 191l, respectively, and a plurality of minute branch electrodes 193h and 193l protruding from the planar shape electrodes 192h and 192l in an oblique direction, e.g., a direction between the vertical (or substantially vertical) and horizontal (or substantially horizontal) directions.

The first subpixel electrode 191h includes a first planar shape electrode 192h disposed in a square region and a plurality of first minute branch electrodes 193h, and is connected with the wide end portion of the first drain electrode 175h by a first connecting portion 197h extending outside the square region.

The first planar shape electrode 192h has a rhombus shape, the center of the first planar shape electrode 192h is disposed at the center of the square region, and each apex of the rhombus shape meets with a boundary of the square region of the first subpixel electrode 191h.

The first planar shape electrode 192h is disposed on the color filter 230 and the step forming portion 220p having a cross shape. The step forming portion 220p forms a step due to a structure protruding upward from the color filter 230 overlapped with the first planar shape electrode 192h, and the first planar shape electrode 192h has the step provided by the step forming portion 220p. That is, the planar shape electrode 192h may have a protruding structure having a cross shape, and the cross-shaped protruding structure provides pretilts to the liquid crystal molecules 310 disposed at the center of the square region to control alignment directions of the liquid crystal molecules 310, and as a result, a texture is reduced.

The plurality of first minute branch electrodes 193h extends from a side of the oblique direction of the first planar shape electrode 192h. The plurality of first minute branch electrodes 193h occupies the rest of the region of the square region, and forms an angle of about 45 degrees with the gate lines 121 or the data lines 171, and forms an angle of about 90 degrees with the side of the oblique direction of the first planar shape electrode 192h. It is contemplated; however, that any other suitable angles may be utilized.

As seen in FIG. 1, the first subpixel electrode 191h includes a first vertical connecting portion 194h that connects the first planar shape electrode 192h and an end of the plurality of first minute branch electrodes 193h in the vertical (or substantially vertical) direction. However, according to exemplary embodiments, the first vertical connecting portion 194h may be excluded, and in this case, the plurality of first minute branch electrodes 193h may have a protrude shape.

The second subpixel electrode 191l includes a second planar shape electrode 192l and a plurality of second minute branch electrodes 193l that are disposed in a vertically long rectangular region, and is connected with a wide end portion of the second drain electrode 175l by a second connecting portion 197l extending outside the square region.

The second planar shape electrode 192l has a rhombus shape having the same length on all sides. The center of the second planar shape electrode 192l is disposed at the center of the rectangular region, and right and left apexes among apexes of the rhombus shape meet with a boundary of the rectangular region. The rest of two apexes of the second planar shape electrode 192l are connected to a vertical extension part 195l extending in a vertical (or substantially vertical) direction, and the other end of the vertical extension part 195l meets with the boundary of the rectangular region. According to certain exemplary embodiments, upper and lower apexes of the second planar shape electrode 192l, in addition to the right and left apexes, may meet with the boundary of the rectangular region, and in this case, the second planar shape electrode 192l has a vertically long rhombus shape, which is different from the depicted rhombus shape. Further, in this case, the vertical extension part 195l described above may not be utilized.

The second planar shape electrode 192l covers the color filter 230 and the step forming portion 220p having a cross shape. The step forming portion 220p forms a step due to a structure protruding upward from the color filter 230 overlapped with the second planar shape electrode 192l, and the second planar shape electrode 192h has the step provided by the step forming portion 220p.

A plurality of second minute branch electrodes 193l extends from a side of the oblique direction of the second planar shape electrode 192l and two vertical extension parts 195l. The plurality of second minute branch electrodes 193l occupies the rest of the region of the square region, and forms an angle of about 45 degrees with the gate line 121 or the data line 171 and forms an angle of about 90 degrees with the side of the oblique direction of the second planar shape electrode 192l. It is contemplated, however, that any other suitable angle may be utilized.

According to exemplary embodiments, the second subpixel electrode 191l includes a second vertical connecting portion 194l that connects the second planar shape electrode 192l and an end of the plurality of second minute branch electrodes 193l in the vertical (or substantially vertical) direction. However, according to certain exemplary embodiments, the second vertical connecting portion 194*l* may be excluded, and in this case, the plurality of second minute branch electrodes 193*l* may have a protrusion shape.

The first subpixel electrode 191*h* and the second subpixel electrode 191*l* are configured to receive data voltage from the first drain electrode 175*h* and the second drain electrode 175*l* through the first contact hole 185*h* and the second contact hole 185*l*. The first subpixel electrode 191*h* and the second subpixel electrode 191*l*, to which the data voltage is applied, are configured to generate (or otherwise impose) electric fields (together with the common electrode 270 of the common electrode panel 200) to determine (or otherwise control) directions of the liquid crystal molecules 310 of the liquid crystal layer 3 disposed between electrodes 191 and 270. As such, luminance of light passing through the liquid crystal layer 3 varies according to the directions of the liquid crystal molecules 310.

The first subpixel electrode 191*h* and the common electrode 270 form a first liquid crystal capacitor Clch together with the liquid crystal layer 3 disposed between the first subpixel electrode 191*h* and the common electrode 270. The second subpixel electrode 191*l* and the common electrode 270 form a second liquid crystal capacitor Clcl together with the liquid crystal layer 3 disposed between the second subpixel electrode 191*l* and the common electrode 270. As a result, even after the first and second thin film transistors Qh and Ql are turned off, the applied voltage is maintained.

The first and second subpixel electrodes 191*h* and 191*l* are overlapped with the storage electrode line 131 in addition to the storage electrode 135 to form the first and second storage capacitors Csth and Cstl. The first and second storage capacitors Csth and Cstl are configured to reinforce a voltage maintaining capacity of the first and second liquid crystal capacitors Clch and Clcl.

The capacitor electrode 134 and the wide end portion extension 177*c* of the third drain electrode 175*c* are overlapped with each other with the gate insulating layer 140 and a fourth semiconductor (not illustrated) disposed therebetween to form the step-down capacitor Cstd. In exemplary embodiments, the fourth semiconductor may be removed from between the capacitor electrode 134 and the wide end portion extension 177*c* of the third drain electrode 175*c*, which form the step-down capacitor Cstd.

A lower alignment layer 11 is disposed on the pixel electrode 191 and the exposed color filter 230 or the overcoat. The lower alignment layer 11 may be a vertical alignment layer and may be an alignment layer containing a photoreaction material.

Next, the upper panel 200 will be described.

In exemplary embodiments, since the color filter 230 and the light blocking member 220 are disposed on the lower panel 100, a structure of the upper panel 200 may be relatively simple in comparison to the lower panel 100. The common electrode 270 is disposed below an upper substrate 210.

An upper alignment layer 21 is disposed below the common electrode 270. The upper alignment layer 21 may be a vertical alignment layer and may be an alignment layer photoaligned by a photo polymerization material.

Polarizers (not illustrated) are provided on the outer sides of the lower and upper panels 100 and 200, and transmissive axes of the two polarizers are perpendicular (or substantially perpendicular) to each other. It is noted that one transmissive axis of the two transmissive axes may be parallel to the gate lines 121. However, the polarizer may be disposed only on one outer side of the lower and upper panels 100 and 200.

The liquid crystal layer 3 has negative dielectric anisotropy, and the liquid crystal molecules 310 of the liquid crystal layer 3 are aligned so that long axes thereof are vertical (or substantially vertical) to the surfaces of the lower and upper panels 100 and 200 when an electric field is not applied or otherwise imposed on the liquid crystal layer 3. Accordingly, when the electric field is not applied, incident light does not pass through a crossed polarizer, but is blocked.

As described above, the first subpixel electrode 191*h* and the second subpixel electrode 191*l* to which the data voltage is applied are configured to generate the electric field together with the common electrode 270 of the common electrode panel 200, and as a result, the liquid crystal molecules 310 of the liquid crystal layer 3, which are aligned so as to be vertical (or substantially vertical) to the surfaces of electrodes 191 and 270 while the electric field is not applied, are inclined toward the horizontal (or substantially horizontal) direction with respect to the surfaces of electrodes 191 and 270. Luminance of light passing through the liquid crystal layer 3 varies according to the degree of inclination of the liquid crystal molecules 310.

The liquid crystal display device may further include a spacer (not illustrated) for maintaining a cell gap between the lower and upper panels 100 and 200, and the spacer may be coupled to the upper panel 200 to be disposed below the common electrode 270.

The liquid crystal layer 3 disposed between the lower panel 100 and the upper panel 200 includes the liquid crystal molecules 310 having negative dielectric anisotropy.

The liquid crystal layer 3 may further include an alignment polymer polymerized by light, such as ultraviolet light. The alignment polymer included in the liquid crystal layer 3 is configured to provide a pretilt angle to the liquid crystal layer 3, and a method of providing the pretilt angle is described in more detail in association with FIG. 6. That is, in the case where the alignment direction of the liquid crystal layer 3 is sufficiently controlled without the alignment polymer providing the pretilt, the polymer may not be included. According to exemplary embodiments, the alignment polymer polymerized by light, such as ultraviolet light, may be included in the alignment layer disposed on the upper panel 200 and the lower panel 100, and the alignment polymer may be included via the method described in association with FIG. 6. Accordingly, it is noted that the alignment polymer may not be included in the liquid crystal layer 3.

Hereinafter, a control characteristic of the liquid crystal molecules 310 by a step which is provided in a step forming portion included in the light blocking member 220 as described above will be described in more detail.

Figure 5:
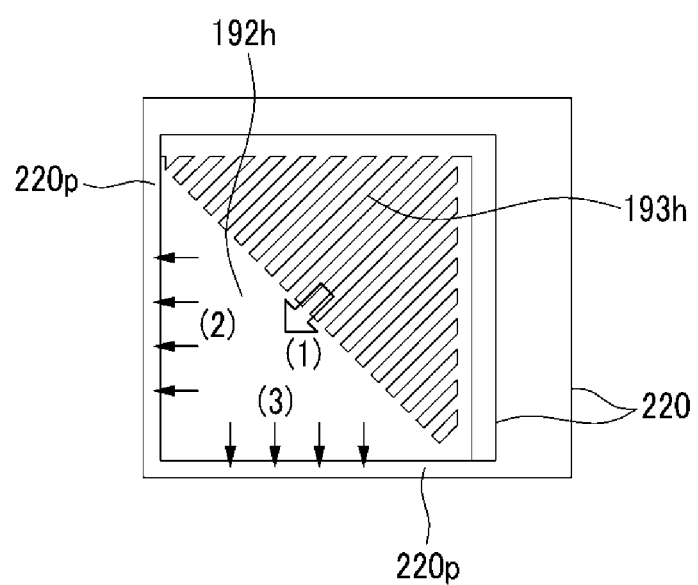
FIG. 5 is a partial plan view demonstrating how liquid crystal molecules may be controlled by a step forming portion in the liquid crystal display device of FIG. 1, according to exemplary embodiments.

FIG. 5 is a partial plan view demonstrating how liquid crystal molecules may be controlled by a step forming portion in the liquid crystal display device of FIG. 1, according to exemplary embodiments.

In particular, it is noted that FIG. 5 is a plan view of a partial configuration positioned at an upper right corner of the first subpixel electrode 191*h* in the liquid crystal display device of FIG. 1. Referring to FIG. 5, the liquid crystal molecules 310 are inclined according to an acting force in a direction (1) in a boundary of the first minute branch electrode 193*h* and the first planar shape electrode 192*h*.

According to exemplary embodiments, since a horizontal (or substantially horizontal) stem and a vertical (or substantially vertical) stem of the first planar shape electrode 192*h* form a field by the step forming portion 220*p* (as illustrated in FIG. 2), the liquid crystal molecules 310 are affected by at least one acting force in a direction (2) and/or a direction (3).

If the step forming portion 220*p* included in the light blocking member 220 does not exist, then since the liquid crystal molecules 310 do not have a control driving force near the horizontal stem and the vertical stem of the first planar shape electrode 192*h*, a texture such as a whirlwind may occur. However, in exemplary embodiments, by the step forming portion 220*p* included in the light blocking member 220, most of the liquid crystal molecules 310 disposed in the first planar shape electrode 192*h* may continuously receive the force in the direction (1) acted in the boundary of the first minute branch electrode 193*h* and the second planar shape electrode 192*h*. Further, the horizontal stem and the vertical stem of the first planar shape electrode 192*h* overlapped with the step forming portion 220*p* may become a non-transmissive region on the boundary meeting with the liquid crystal molecules 310 inclined in an opposite direction to each other.

While only a part of the first planar shape electrode 192*h* was described in association with FIG. 5, the rest of the parts of the first planar shape electrode 192*h*, the liquid crystal molecules 310 may be inclined according to the same basic principles. That is, the first subpixel electrode 191*h* may include a first region where the liquid crystal molecules 310 are inclined in the direction (1), a second region where the liquid crystal molecules 310 are inclined in a direction that forms an angle of 90 degrees with the direction (1), a third region where the liquid crystal molecules 310 are inclined in a direction that forms an angle of 180 degrees with the direction (1), and a fourth region where the liquid crystal molecules 310 are inclined in a direction that forms an angle of 270 degrees with the direction (1).

Figure 6:
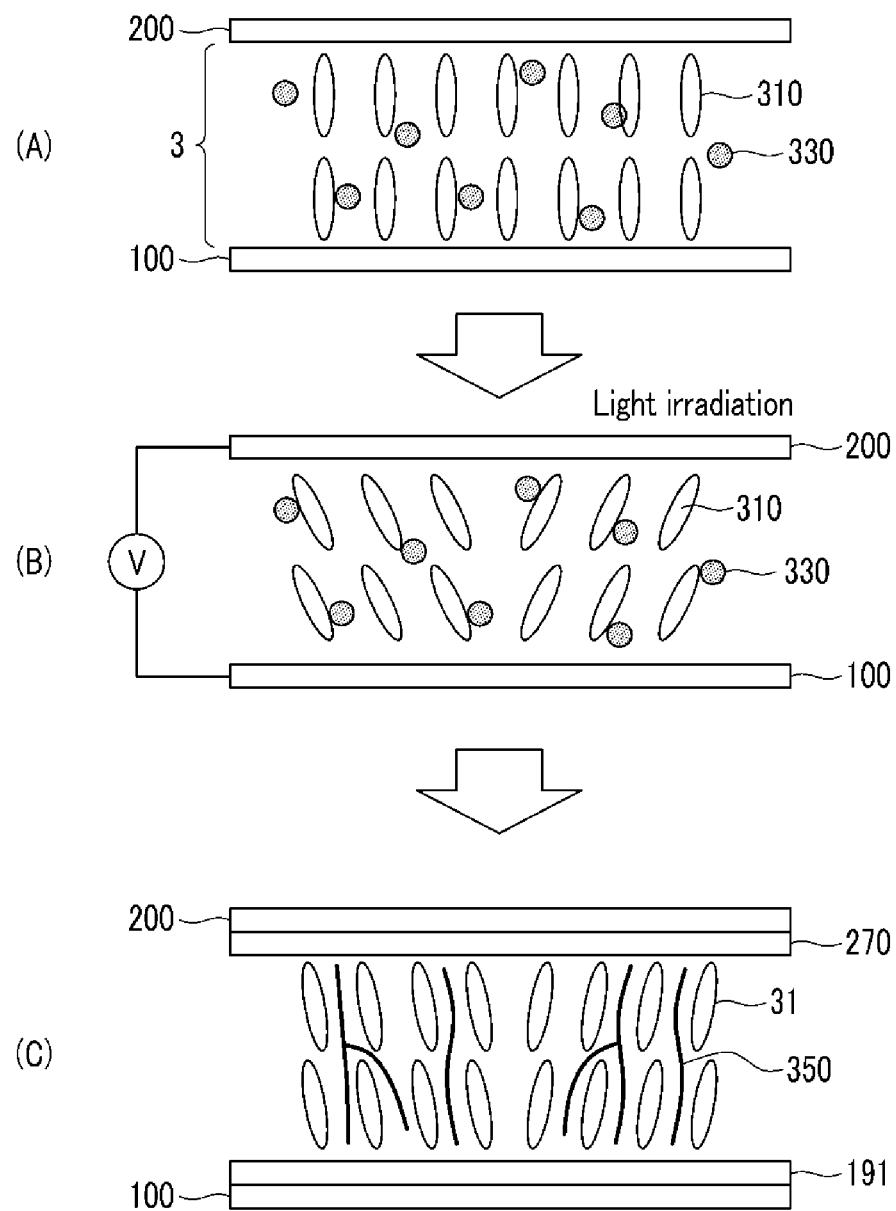
FIG. 6 is a diagram of a process in which liquid crystal molecules are pretilted via an alignment aid polymerized by light, according to exemplary embodiments.

FIG. 6 is a diagram of a process in which liquid crystal molecules are pretilted via an alignment aid polymerized by light, according to exemplary embodiments.

Referring to FIG. 6, first, an alignment aid 330 (such as monomers cured by polymerization due to light, such as ultraviolet light) is injected between the lower and upper panels 100 and 200. According to various exemplary embodiments, the alignment aid 330 may be simultaneously injected together with the liquid crystal material 310 or may be injected before or after the liquid crystal material 310 is injected. The alignment aid 330 may be reactive mesogen polymerized by light, such as ultraviolet light.

Next, data voltage is applied to the first and second subpixel electrodes and common voltage is applied to the common electrode of the upper panel 200 to generate (or otherwise impose) an electric field in (or on) the liquid crystal layer disposed between the lower and upper panels 100 and 200. Then, the liquid crystal molecules 310 of the liquid crystal layer are inclined in a regular direction in response to the electric field. That is, the liquid crystal molecules 310 may be aligned with respect to fringes of the electric field imposed between the lower and upper panels 100 and 200.

While the liquid crystal molecules 310 of the liquid crystal layer are inclined in a regular direction, the alignment aid 330 is polymerized by irradiating light, such as ultraviolet light, to form an alignment polymer 350 as illustrated in FIG. 6. The alignment polymer 350 is adjacent to the lower and upper panels 100 and 200. The alignment directions of the liquid crystal molecules 310 are determined by the alignment polymer 350 so as to have pretilts in the directions as described above. Accordingly, while voltages are not applied to the field generating electrodes 191 and 270, the liquid crystal molecules 310 having pretilts are aligned in four different directions, such as four directions that converge upon (or diverge from) a central portion of a corresponding pixel area, e.g., a central portion at which the vertical and horizontal step forming portions cross.

As a result, the liquid crystal molecules 310 have the pretilts in all four directions in each region of the upper subpixel or the lower subpixel of one pixel.

The pretilt using the alignment polymer as illustrated in FIG. 6 may be subordinately used in the case where the texture is not reduced by controlling the liquid crystal molecules 310 by only the step which is provided by the step forming portion 220*p* included in the light blocking member 220.

Figure 7:
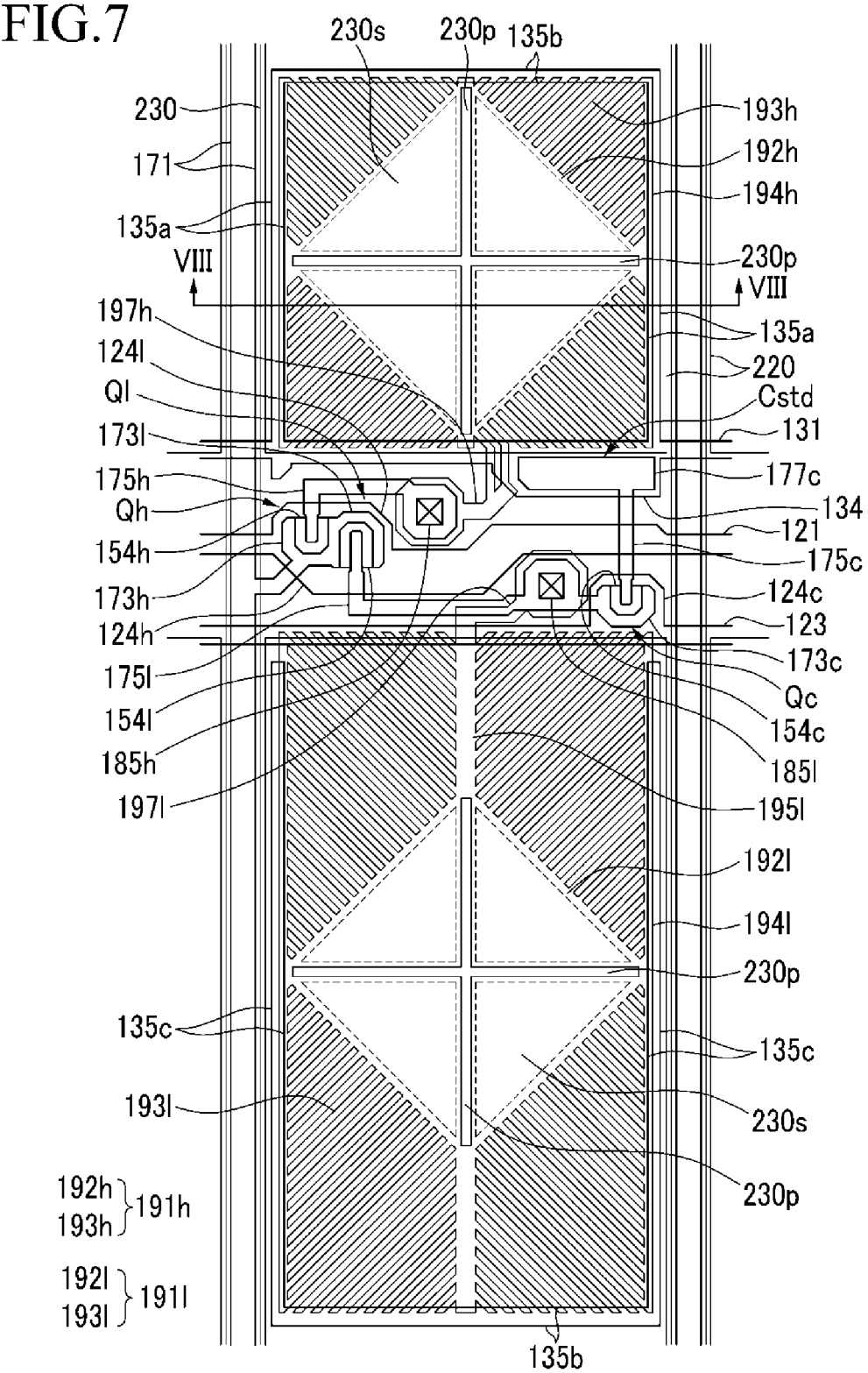
FIG. 7 is a plan view of a liquid crystal display device, according to exemplary embodiments.
Figure 8:
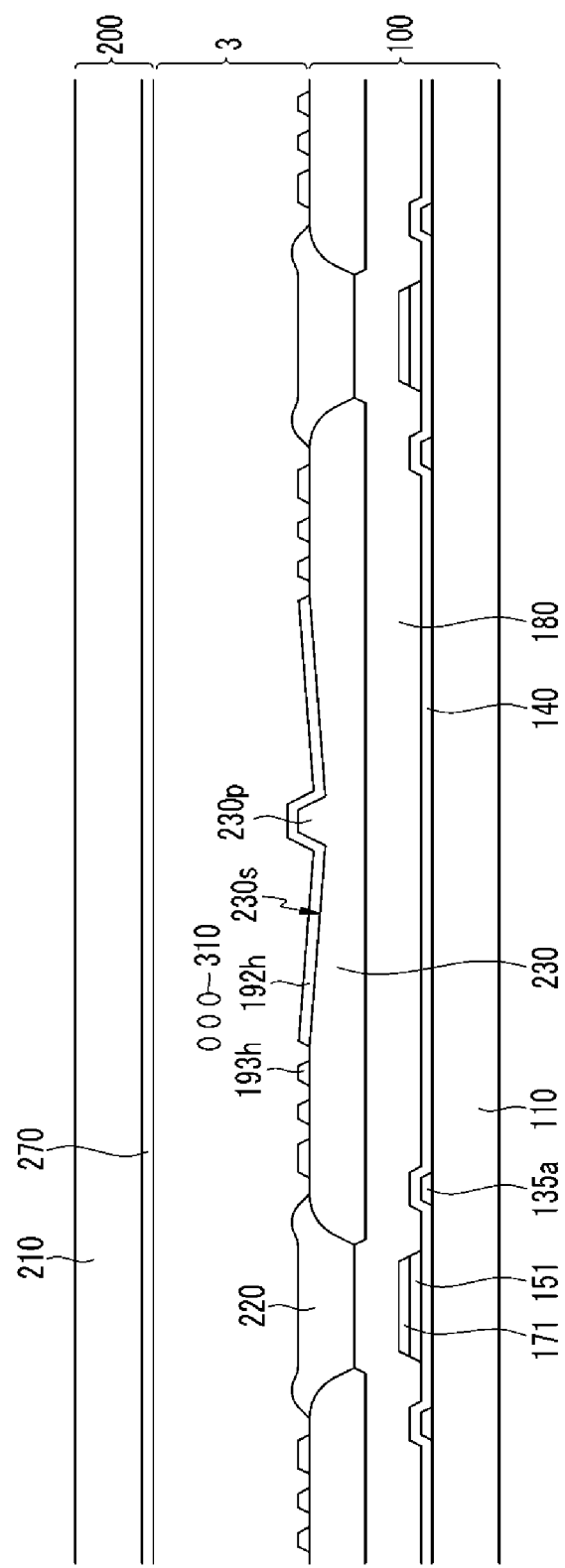
FIG. 8 is a cross-sectional view of the liquid crystal display of FIG. 8 taken along sectional line VIII-VIII, according to exemplary embodiments.
Figure 9:
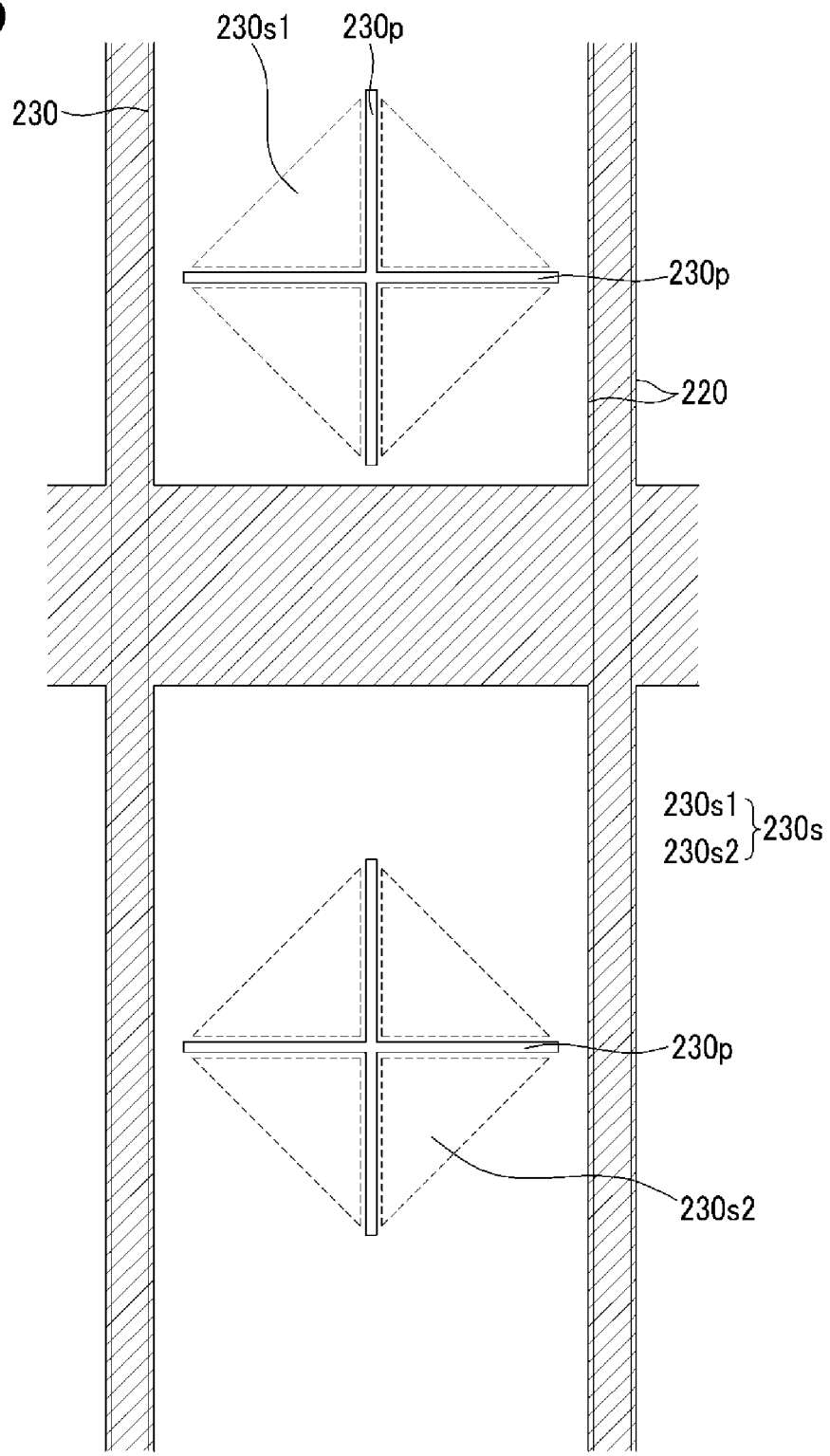
FIG. 9 is a plan view of a color filter and a light blocking member of the liquid crystal display device of FIG. 7, according to exemplary embodiments.

FIG. 7 is a plan view of a liquid crystal display device, according to exemplary embodiments. FIG. 8 is a cross-sectional view of the liquid crystal display of FIG. 8 taken along sectional line. FIG. 9 is a plan view of a color filter and a light blocking member of the liquid crystal display device of FIG. 7.

In order to avoid obscuring exemplary embodiments described herein, only the differences between exemplary embodiments of the liquid crystal displays of FIGS. 1 and 7 will be described. The other constituent elements are similarly fashioned and/or disposed.

Referring to FIGS. 7 and 8, the constituent elements below the passivation layer 180 are almost the same as those described in association with FIG. 1. As seen in FIGS. 7 and 8, however, a color filter 230 including an inclined portion 230*s* is disposed on the passivation layer 180. In detail, referring to FIG. 9, the color filter 230 is elongated in a vertical (or substantially vertical) direction along a space between the adjacent data lines 171 and has inclined portions 230*s*1 and 230*s*2 of which heights are changed in a partial region of a portion overlapped with the first and second subpixel electrodes 191*h* and 191*l* of the color filter 230. The inclined portion 230*s* has a rhombus structure as illustrated in FIG. 9. The rhombus structure of the first inclined portion 230*s*1 is disposed so that the boundaries and the apexes of the square region occupied by the first planar shape electrode 192*h* are in contact with each other.

The rhombus structure of the second inclined portion 230*s*2 is disposed at the center of the rectangle region occupied by the second planar shape electrode 192*l*, and the rhombus structure of the second inclined portion 230*s*2 is disposed so that the horizontal (or substantially horizontal) boundary and apexes of the rectangle region occupied by the second planar shape electrode 192*l* are in contact with each other, but the vertical (or substantially vertical) boundary and apexes are spaced apart from each other with a regular distance. According to exemplary embodiments, however, the structure of the second subpixel electrode 192*l* may be modified, and accordingly, the rhombus structure of the second inclined portion 230*s*2 may be formed so that the boundaries and the apexes of the rectangle region occupied by the second subpixel electrode 192*l* are in contact with each other.

In exemplary embodiments, the step forming portion 230*p* is disposed at a horizontal (or substantially horizontal) cross portion and a vertical (or substantially vertical) cross portion of the inclined portion 230*s* of the rhombus structure. The inclined portion 230*s* includes a structure having a height that is gradually decreased toward the step forming portion 230*p* from a side of the rhombus structure. The step forming portion 230*p* may have a structure which protrudes upward from the color filter 230 inclined portion 230*s* having the lowest height and may have a cross shape elongated along the horizontal cross portion and the vertical cross portion of the inclined portion 230*s*.

The inclined portion 230*s* has a structure in which a height is decreased with a regular slope up to the center from one side, and as the height is decreased, the width may be decreased.

The first planar shape electrode 192*h* and the second planar shape electrode 192*l* are disposed on the color filter 230, and the first planar shape electrode 192*h* and the second planar shape electrode 192l cover the inclined portion 230s of the color filter 230 and the step forming portion 230p having a cross shape, respectively. The step forming portion 230p forms the step because the step forming portion 230p has the structure protruding upward from the color filter 230 inclined portion 230s of which the height is decreased, and the first planar shape electrode 192h and the second planar shape electrode 192l have the step provided by the step forming portion 230p. That is, the first planar shape electrode 192h and the second planar shape electrode 192l may have protruding structures having cross shapes, respectively, and the cross-shaped protruding structure serves to control the alignment directions of the liquid crystal molecules by providing the pretilts to the liquid crystal molecules 310 disposed at the center of the square region or the rectangle region, and as a result, the texture is reduced.

Except for the differences described above, the remainder of the liquid crystal display may be similar as described in association with FIG. 1.

Figure 10:
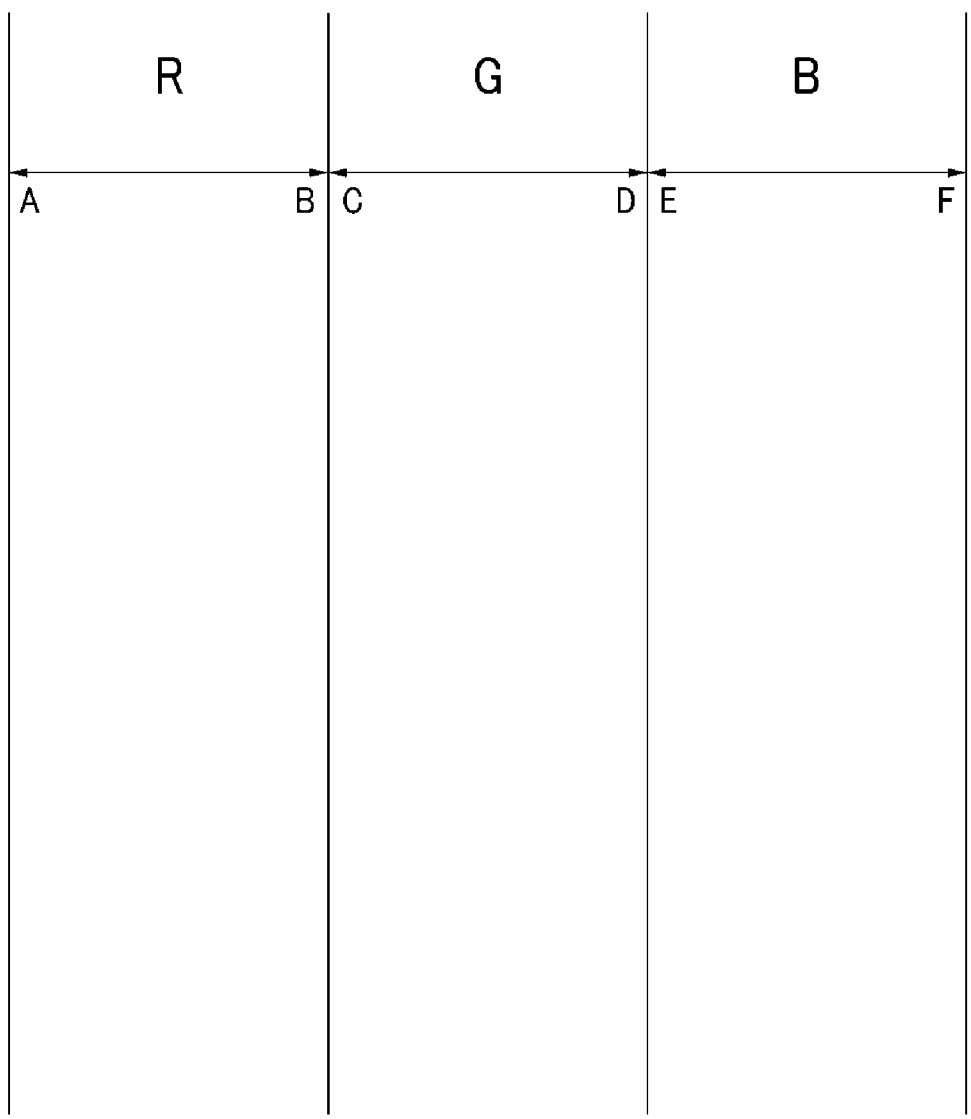
FIG. 10 is a plan view of a modified version of the liquid crystal display device of FIG. 7, according to exemplary embodiments.
Figure 11:
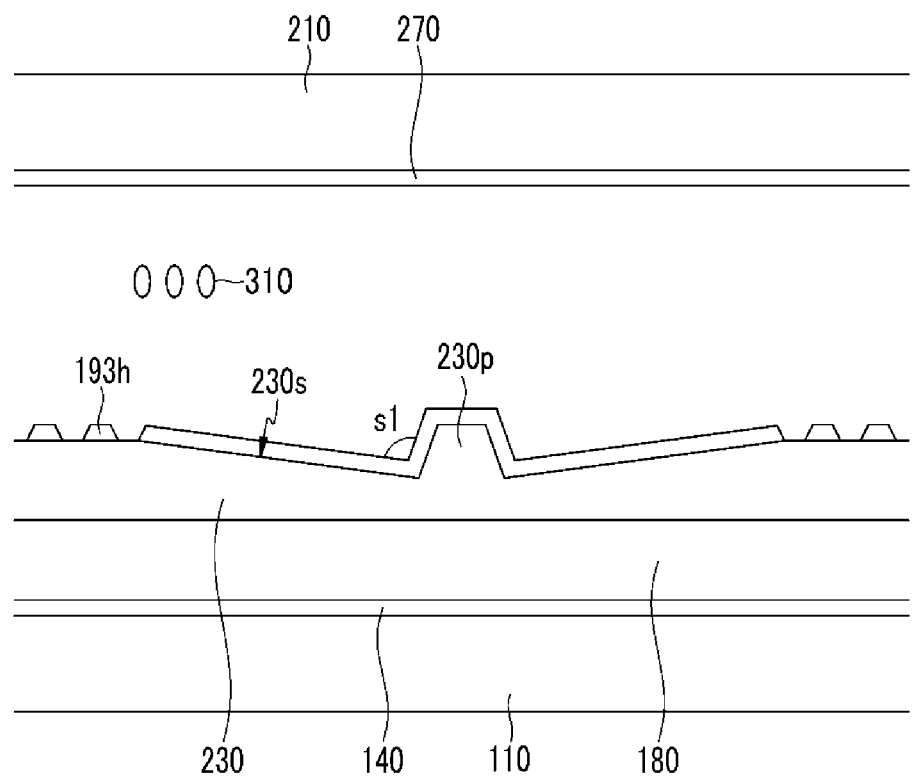
FIG. 11 is a cross-sectional view of a region A-B of FIG. 10, according to exemplary embodiments.
Figure 12:
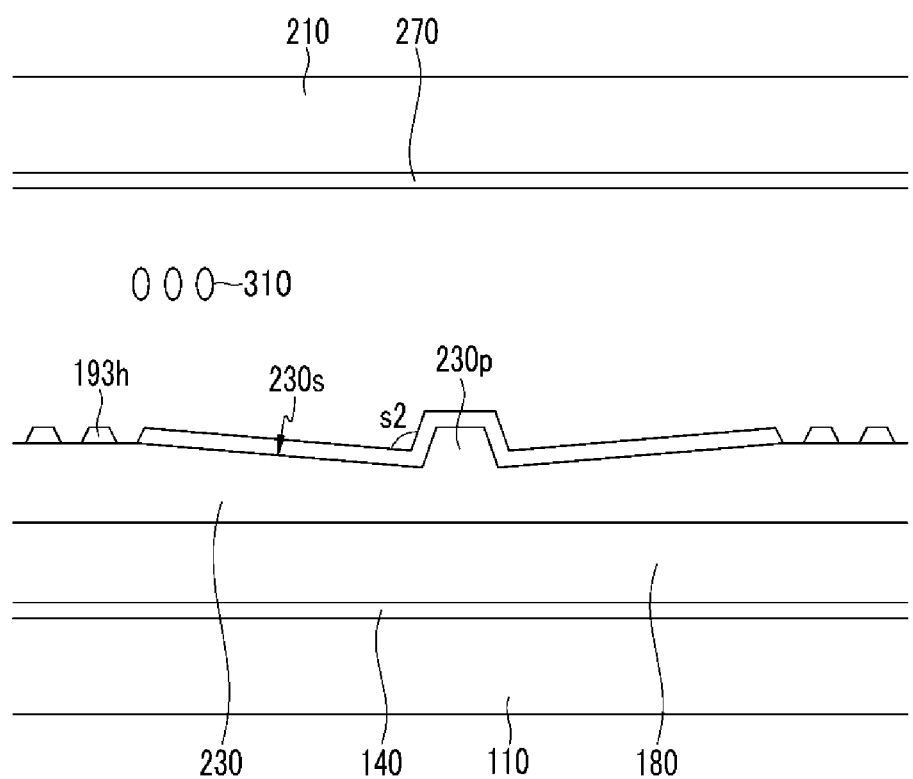
FIG. 12 is a cross-sectional view of a region C-D of FIG. 10, according to exemplary embodiments.
Figure 13:
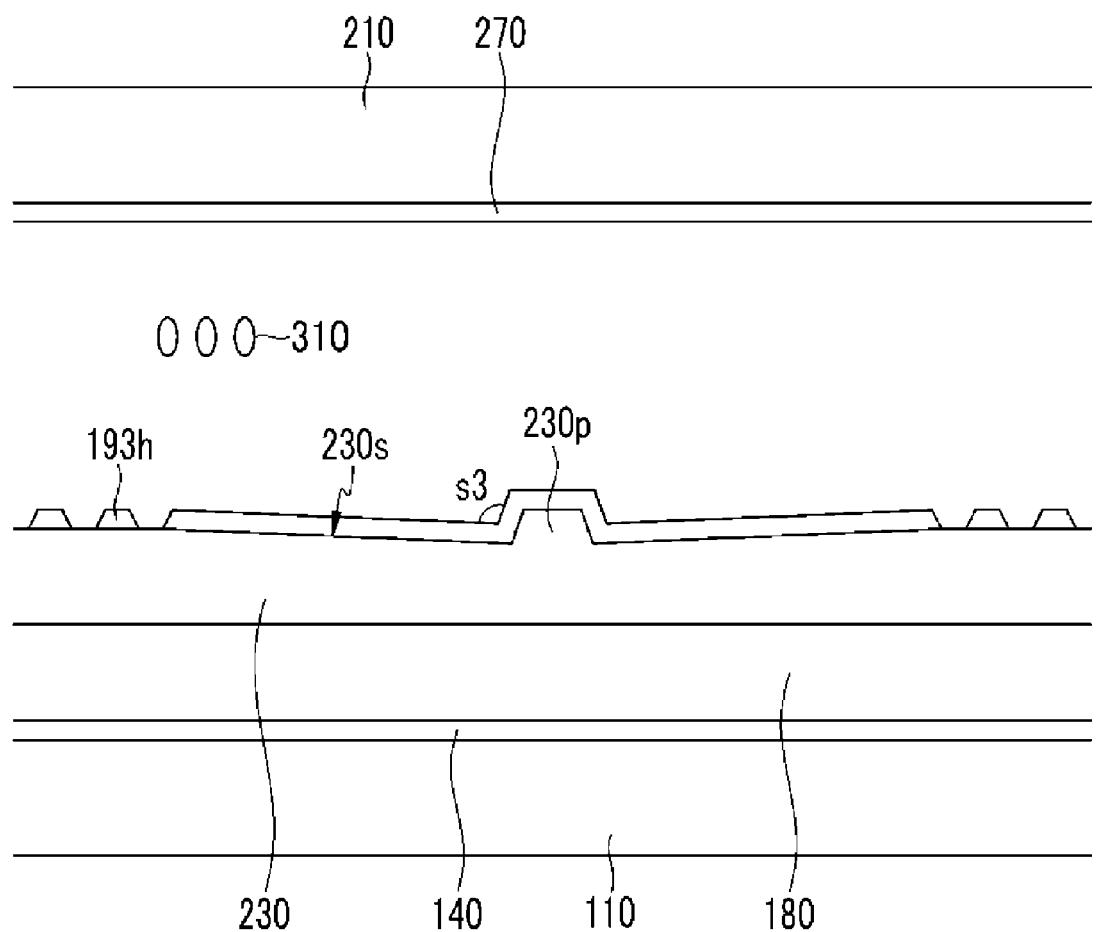
FIG. 13 is a cross-sectional view of a region E-F of FIG. 10, according to exemplary embodiments.

FIG. 10 is a plan view of a modified version of the liquid crystal display device of FIG. 7, according to exemplary embodiments. FIG. 11 is a cross-sectional view of a region A-B of FIG. 10. FIG. 12 is a cross-sectional view of a region C-D of FIG. 10. FIG. 13 is a cross-sectional view of a region E-F of FIG. 10.

The color filter 230 is elongated in the vertical (or substantially vertical) direction along a space between the adjacent data lines 171. Each color filter 230 may display one of primary colors, such as three primary colors of red, green, and blue, and as illustrated in FIG. 10, each color filter 230 may be arranged so that a red color filter R, a green color filter G, and a blue color filter B are adjacent to each other.

Referring to FIGS. 11 to 13, a first angle s1 formed by the inclined portion 230s disposed in the red color filter R and the step forming portion 230p, a second angle s2 formed by the inclined portion 230s disposed in the green color filter G and the step forming portion 230p, and a third angle s3 formed by the inclined portion 230s disposed in the blue color filter B and the step forming portion 230p have different sizes. In exemplary embodiments, the first angle s1 formed by the inclined portion 230s disposed in the red color filter R and the step forming portion 230p may be smallest. That is, the height of a portion where the inclined portion 230s disposed in the red color filter R contacts the step forming portion 230p is smallest. Here, the second angle s2 may be smaller than the third angle s3.

In exemplary embodiments, the red color filter R, the green color filter G, and the blue color filter B are the same as each other in thicknesses of the portions except for the inclined portion 230s.

As described above, by increasing the step by the inclined portion 230s of the red color filter R, the sameness of a color coordinate may be acquired and an effect for preventing a change in the luminance with time may be acquired.

While certain exemplary embodiments and implementations have been described herein, other embodiments and modifications will be apparent from this description. Accordingly, the invention is not limited to such embodiments, but rather to the broader scope of the presented claims and various obvious modifications and equivalent arrangements.

What is claimed is:

1. A display device, comprising:
   a substrate;
   a thin film transistor disposed on the substrate;
   a plurality of color filters disposed on the substrate;
   a light blocking member disposed between the plurality of color filters and on the thin film transistor; and
   a pixel electrode disposed on at least one of the plurality of color filters, the pixel electrode comprising a planar shape electrode and a plurality of minute branches extending from the planar shape electrode,
   wherein the at least one of the plurality of color filters or the light blocking member comprises a step forming portion overlapped by the planar shape electrode.

2. The display device of claim 1, wherein:
   the light blocking member comprises the step forming portion; and
   the step forming portion is disposed on a portion of the at least one color filter overlapped by the planar shape electrode.

3. The display device of claim 2, wherein:
   the planar shape electrode comprises a rhombus shape; and
   the step forming portion comprises a cross shape.

4. The display device of claim 3, wherein:
   the step forming portion extends from the light blocking member disposed between the plurality of color filters.

5. The display device of claim 4, wherein:
   the planar shape electrode is disposed on the step forming portion; and
   the planar shape electrode comprises a portion protruding from the portion overlapped by the step forming portion.

6. The display device of claim 5, wherein:
   the step forming portion is disposed directly on the at least one color filter.

7. The display device of claim 6, further comprising:
   a second substrate facing the substrate;
   a common electrode disposed below the second substrate; and
   a liquid crystal layer disposed between the substrate and the second substrate, the liquid crystal layer comprising liquid crystal molecules.

8. The display device of claim 7, wherein:
   the liquid crystal layer comprises an alignment polymer polymerized by light.

9. The display device of claim 8, wherein the alignment polymer causes, at least in part, respective pretilt alignment directions of the liquid crystal molecules to converge upon or diverge from substantially the center of the cross shape of the step forming portion.

10. The display device of claim 7, further comprising:
    an alignment layer disposed on the pixel electrode or below the common electrode,
    wherein the alignment layer comprises an alignment polymer polymerized by light.

11. The display device of claim 7, wherein an electric field generated in association with the pixel electrode causes, at least in part, respective alignment directions of the liquid crystal molecules to converge upon or diverge from substantially the center of the cross shape of the step forming portion.

12. The display device of claim 1, wherein:
    the at least one of the plurality of color filters comprises the step forming portion, and
    the step forming portion is disposed at a portion of the at least one color filter overlapped by the planar shape electrode.

13. The display device of claim 12, wherein:
    the at least one color filter comprises an inclined portion disposed at a portion overlapped by the planar shape electrode.

14. The display device of claim 13, wherein:
    the thickness of the at least one color filter decreases toward the step forming portion.

15. The display device of claim 14, wherein:
the planar shape electrode comprises a rhombus shape; and
the step forming portion comprises a cross shape.

16. The display device of claim 15, wherein:
the planar shape electrode is disposed on the step forming portion; and
the planar shape electrode comprises a portion protruding from the portion overlapped by the step forming portion.

17. The display device of claim 16, further comprising:
a second substrate facing the substrate;
a common electrode disposed below the second substrate; and
a liquid crystal layer disposed between the substrate and the second substrate, the liquid crystal layer comprising liquid crystal molecules.

18. The display device of claim 17, wherein:
the liquid crystal layer comprises an alignment polymer polymerized by light.

19. The display device of claim 18, wherein the alignment polymer causes, at least in part, respective pretilt alignment directions of the liquid crystal molecules to converge upon or diverge from substantially the center of the cross shape of the step forming portion.

20. The display device of claim 17, further comprising:
an alignment layer disposed on the pixel electrode or below the common electrode,
wherein the alignment layer comprises an alignment polymer polymerized by light.

21. The display device of claim 17, wherein an electric field generated in association with the pixel electrode causes, at least in part, respective alignment directions of the liquid crystal molecules to converge upon or diverge from substantially the center of the cross shape of the step forming portion.

22. The display device of claim 12, wherein:
the plurality of color filters comprises a red color filter, a green color filter, and a blue color filter.

23. The display device of claim 22, wherein:
the red color filter, the green color filter, and the blue color filter respectively comprise a first inclined portion, a second inclined portion, and a third inclined portion that are disposed at a portion overlapped by the planar shape electrode.

24. The display device of claim 23, wherein:
the respective thicknesses of the first inclined portion, the second inclined portion, and the third inclined portion decrease toward the step forming portion.

25. The display device of claim 24, wherein:
an angle formed between the first inclined portion and the step forming portion, an angle between the second inclined portion and the step forming portion, and an angle between the third inclined portion and the step forming portion are different from one another.

26. The display device of claim 25, wherein:
the angle formed between the first inclined portion and the step forming portion is the smallest.

* * * * *